United States Patent [15] 3,649,293
Hoer et al. [45] Mar. 14, 1972

[54] A METHOD FOR PRODUCING A BAY PROTEIN PRODUCT

[72] Inventors: Ralph A. Hoer; Francis E. Calvert, both of St. Louis, Mo.

[73] Assignee: Ralston Purina Company, St. Louis, Mo.

[22] Filed: May 3, 1968

[21] Appl. No.: 726,573

[52] U.S. Cl. ............................................. 99/17, 260/123.5
[51] Int. Cl. ......................................................... A23j 1/14
[58] Field of Search ............................. 99/17, 14; 260/123.5

[56] References Cited

UNITED STATES PATENTS

| | | | |
|---|---|---|---|
| 2,284,700 | 6/1942 | Wahlforss | 99/98 X |
| 3,303,182 | 2/1967 | Sakai et al. | 99/17 X |
| 2,881,076 | 4/1959 | Sair | 99/14 |
| 2,881,159 | 4/1959 | Circle et al. | 260/123.5 |

*Primary Examiner*—A. Louis Monacell
*Assistant Examiner*—William Andrew Simons
*Attorney*—R. W. Brukardt and D. T. Nikaido

[57] ABSTRACT

Producing a soy protein product by forming an aqueous slurry of defatted soy material to dissolve protein and carbohydrate materials out of the cellular or fibrous portion of the defatted soybean material, precipitating the protein on and into the surfaces of the cellular portion of the soybean material, separating this protein-coated solid material from the liquid carbohydrate portion, forming a second aqueous slurry with protein-coated solid material and instantaneously heating at a temperature of from about 220° F. to about 400° F. under pressure, releasing the pressure on this slurry to flush off the indesirable flavor, and then drying the protein-coated cellular material.

4 Claims, No Drawings

METHOD FOR PRODUCING A BAY PROTEIN PRODUCT

BACKGROUND OF THE INVENTION

Persons skilled in the art are familiar with various methods and resulting protein products having protein contents of about 65–70 percent which are stated to have desirable properties such as emulsifying, binding and the like. However, such products are limited as to their end use because of their particular properties, said properties being obtained as the result of the methods employed to produce such products. In one such method, defatted soybean flakes are thoroughly washed with alcohol or alcohol containing some water which causes the alcohol-soluble carbohydrate portion to be dissolved out of the flakes, the alcohol-insoluble protein remaining fixed in the cellular portion of the flake. The solid and liquid portions are separated, the solid portion being freed of alcohol and ground for future use. Although the resulting product provides a source of protein, the particular alcohol treatment causes the protein to become denatured or partially insoluble and substantially detracts from having desirable emulsifying or binding properties. Furthermore, the protein remains bound or entrapped within the cellular structure of the original flake and is not physically available to provide good binding or emulsifying properties.

In another method, defatted soybean flakes are washed in an aqueous acid solution at a pH of about 4.5 (isoelectric point). The carbohydrate materials are dissolved into solution while the protein material is fixed or immobilized in the cellular material of the original flake. The isoelectric insoluble protein materials, following separation from the aqueous acid solution, are subsequently dried, ground and stored for future use. In this method, although the protein is not as highly denatured as with the previously described alcohol treatment, it is left in an "entrapped" state in the cellular structure of the original flake, and, therefore, said protein is not subsequently physically available to provide the desirable functional properties even if the acid is removed as hereinbefore described.

A third method is to strongly heat-denature the protein so that it is insoluble while the carbohydrates remain soluble. This type of product does not have good functional properties because the protein has been rendered insoluble by the heat treatment.

SUMMARY OF THE INVENTION

It has now been discovered that a soy protein product can be produced which has excellent functional properties, e.g., emulsifying, binding and water absorbing, and without the disadvantages of prior art products which have been previously described.

The present invention is accomplished in a novel process which comprises the steps of forming an aqueous first slurry containing a defatted soybean material to induce the protein to become soluble and leave the cell, adjusting the pH of the aqueous slurry to the isoelectric point of the protein material, thereby precipitating and depositing a layer of protein on and into the surfaces of the cellular portion of the soybean material, separating the protein coated solid material from the liquid portion thereof, forming a second aqueous slurry with the protein coated solid material, adjusting the pH of the slurry to place the protein into solution and subsequently drying the resulting solid product. It should be emphasized that the cellular portion of the soybean material is retained throughout the process, that the protein material is precipitated onto the surface of said cellular material and that such cellular material becomes an integral part of the product of the invention.

The initial aqueous slurry containing the defatted soybean material is prepared at a pH such that both the protein and carbohydrate materials are dissolved out of the cellular portion of the defatted soybean material into the aqueous solution. The pH of the slurry, containing the dissolved protein and carbohydrate materials, is adjusted to a pH equal to the isoelectric point of the protein at which time the dissolved protein is deposited by precipitation onto the surfaces of the cellular material of the original soybean material. The cellular material coated with the precipitated protein is carefully separated from the solution, the latter solution containing the dissolved carbohydrate materials. The solid protein coated material is washed and reslurried. The slurry is adjusted to a pH such that much of the protein is redispersed and, thereafter, said slurry is preferably rapidly heated to an elevated temperature and held at such temperature for a very brief period of time. Such elevated temperature assists in providing the desirable properties of the invention such as improved flavor. The slurry is subsequently dried by conventional means.

DESCRIPTION OF THE PREFERRED EMBODIMENTS

The soybean material employed in the present invention is prepared by known methods. For example, soybeans are contacted with an organic solvent, e.g., hexane, to extract the oil therefrom. The resulting solid product is commonly called soybean meal or flakes. Such meal or flakes or, alternately, finely ground flour made therefrom may be used as the starting material to produce the particular product of the invention. The solvent extracted soybean material is referred to as defatted soybean flakes, meal or flour and such terminology will be used to describe the extracted material.

The present invention is best accomplished by forming a slurry with defatted soybean flakes and water. The slurry is agitated for a sufficient time to extract the soluble protein and carbohydrate materials contained within the physical cellular structure of the original flakes. The slurry consists of the suspended solid, cellular seed material with a major portion of the protein and carbohydrate materials in solution. If desired, the slurry may be adjusted to a slightly alkaline pH to increase the speed of removal of the soluble materials. The aqueous slurry may be formed at a pH of from about 6.5 to about 9 and preferably from about 6.8 to about 8. As an alternative procedure, the protein and carbohydrate materials may be dissolved out of the flakes by placing the flakes into an acid solution having a pH of from about 1.2 to about 2.5.

The pH of the slurry is adjusted to the isoelectric point of the protein to cause the protein to precipitate out of solution on and into the surfaces of the liquid swollen solid thereby depositing a rich protein coating on the cellular seed material. The slurry is adjusted to a pH of from about 4 to about 5 and preferably to about 4.5. The soluble extracted carbohydrates remain in solution.

The solid protein coated cellular material is separated from the liquid as completely as practicable and is washed sufficiently to remove substantially all of the soluble carbohydrates that may remain in the protein coated solid material. The solid material is then suspended in water to obtain an appropriate solids content and the slurry is adjusted to a pH of from about 5.5 to about 7.5 and preferably about 6.8 to obtain a dispersible product. If an acid product is desired, the pH is adjusted to a range of from about 2.0 to about 3.5 and preferably about 3. Where it is desirable not to adjust the pH, the slurry may be maintained at the isoelectric point, e.g., about pH 4.5, for further processing. The slurry in any one of the pH ranges may be subjected to dynamic instantaneous heating at an elevated temperature range while also being dynamically and physically worked, preferably almost simultaneously. Currently, the most satisfactory way of achieving this is to pass the slurry through a device commonly known as a jet cooker. For example, it includes adjacent jet nozzle orifices, normally concentric, through which the slurry and the pressurized steam used as a heating agent are ejected at high velocities in intersecting flow patterns, so that each tiny bit of slurry is instantly and dynamically heated by the steam while simultaneously being subjected to severe physical forces at the nozzle, such physical working being largely of a shearing nature and to expose new surface areas of the protein to promote the volatilization of the undesirable flavor components. The physical working of each tiny portion is believed to expose the undesirable flavor components associated therein to physical action, and this physical action of working together with the elevated temperature heat treatment is believed to weaken and/or loosen the tenacious attraction between the undesirable components and the complex protein molecules, to an extent where these components can be removed with the flashed off vapors in a subsequent vacuum chamber treatment. It is preferred that the jet cooking be combined with a subsequent vacuum chamber treatment to obtain the desirable properties of the product of the invention. This physical working and heating results in substantially eliminating the characteristic soy flavor, but more importantly, prepares the material for the subsequent processing steps. The temperature range to which the slurry is heated for the desired results is about 220° F. – 400° F., although the temperature should not be in the lower region of this range unless the product is subsequently vented into a high-vacuum chamber after being held under pressure in a special holding chamber. Normally, the temperature should be about 285° F. – 320° F. for best results. The slurry is held at such temperatures for a period of from about 5 to about 30 seconds. The heated slurry is then immediately released to atmospheric pressure or to a vacuum chamber to "flash off" the volatile, undesirable flavor components and subsequently the evaporatively cooled material is transferred, preferably, to a spray drier where the product is dried to the desired particle size. It is important to note that the above-described treatment produces a product which is nearly sterile and, therefore, highly desirable for use in producing food products.

The defatted soybean material that may be employed in the invention include soybean flakes or meal and soybean flour. The protein contained in such flakes, meal or flour must be present in a soluble form. It is preferred that the flakes be used in the method of the invention since the flour is more difficult to wet and tends to initially form lumps when contacted with the aqueous solution. Although flakes are preferred, it may be desirable at some point in the process to reduce them to a particle size so that the final product can be conveniently dried, e.g., spray dried.

It has been found that it is desirable to form the initial slurry at elevated temperatures in the range of from about room temperature to about 180° F. and preferably from about 80° to about 140° F. Such temperatures may be achieved in various ways including adding flakes to water having the desired temperature or forming the slurry and, thereafter, raising the temperature to the desired level.

The extraction of the soluble proteins and carbohydrates from the flake is best accomplished in the slurry by having the water and flakes present in a ratio in the range from about 2:1 to about 100:1 by weight and preferably from about 8:1 to about 20:1 (water:flakes). The preferred ranges of the ratio of water to flakes provides a highly efficient and economical means of extraction. Where desired, the slurry may be adjusted to a slightly alkaline pH to decrease the time required for extraction of the soluble materials. Chemicals suitable for adjusting the pH to the desired level include sodium hydroxide, calcium hydroxide, ammonium hydroxide and the like.

The pH of the aqueous slurry is adjusted to the isoelectric point of the protein material to uniformly precipitate the dissolved protein on and into the surfaces of the cellular material. The desired pH is obtained by utilizing suitable food acids such as phosphoric, hydrochloric, sulfuric, sulfurous and the like.

After the protein has been precipitated onto the surface of the cellular material, and the solid and liquid has been separated, the solid material is washed to remove additional soluble carbohydrates which may be present. It is then preferably dispersed in water to a total solids content of from about 12 to about 18 percent by weight before being neutralized. The described range of dispersed solids has been found to be convenient for drying as by spray drying.

Subsequent to adjusting the dispersed protein to within the above-described solids range and prior to drying, the dispersed protein mixture may be subjected to a flash heat treatment to obtain the desirable properties of the invention, e.g., improved flavor. Such heat treatment is preferably accomplished by subjecting the mixture to live steam in a jet cooker for a period of 5 to 30 seconds. The heated mixture is immediately fed to a vacuumized chamber to simultaneously volatilize any excess moisture and undesirable flavor components and subsequently fed to a spray drier to produce the final product. Satisfactory results may also be obtained by heating the mixture containing the appropriate solids content by means of a suitable heat exchanging means and immediately passing the heated mixture to a vacuum chamber prior to drying the resulting product.

The product produced by the process, as previously set forth, in addition to excellent flavor and very low-micro-organism load has excellent emulsifying, binding and water absorbing properties not heretofore obtainable by methods known to the art. Such products may be used in various ways such as in the production of food ingredients and food products.

The following examples are illustrative of the invention and are not intended to limit the scope thereof.

EXAMPLE 1

A slurry comprising soybean flakes, containing soluble protein therein, and water was prepared wherein the water to flakes ratio was 14:1 by weight. The water had a temperature of 90° F. prior to formation of the slurry and the slurry was agitated for about 30 minutes. The slurry was passed through a wet grinder where the solid particles were reduced to a particle size that would pass through a 0.010 inch perforated grinder screen. The ground slurry was adjusted to a pH of about 4.5 with phosphoric acid to deposit the protein on and into the surfaces of the solid cellular seed material. The protein coated slurry was concentrated in a centrifuge to about 25 percent solids by weight, diluted with 90° F. water back to the original volume and again concentrated to 25 percent solids by weight. The slurry containing the protein coated solids was diluted to 15 percent by weight solids and the resulting slurry adjusted to a pH of about 6.8 with sodium hydroxide. The pH adjusted suspended slurry was fed to a jet cooker and heated instantaneously to 310° F., held at that temperature for about 5 seconds and, thereafter, injected into a vacuum chamber to flash off the excess vapors and volatile undesirable flavor components. The deflavored, essentially sterile protein product was fed to a spray drier under pressure of about 5,000 p.s.i. and exhaust temperature of 180° F. to obtain a dry, particulate product.

The properties of the product produced in accordance with the procedures of Example I (A) were compared with a product (B) which is commercially available. Essentially, product B is produced by contacting soybean flakes with an acid solution at the isoelectric point of the protein (about pH 4.5) to dissolve out only the carbohydrate materials. The protein being insoluble in the solvent remains within the cellular structure. The solids are separated from the liquid and the resulting solid product is processed in a known manner to obtain a dry, neutral, protein product.

Two tests were employed (Test No. 1 and Test No. 2) on products A and B to determine their properties of forming good emulsions (Consistency) and absorbing liquids (Fat Suspension).

TEST No. 1

Two grams of powdered sample were weighed into a 50 ml. beaker and 14 ml. of tap water heated to 80° F. was added. The mixture or slurry was stirred until smooth. The consistency was noted (thick, thin, pourability, type of emulsion, etc.). Ten mls. of liquid vegetable oil were added and mixture again stirred until smooth. The slurry was left to stand at room temperature for about 60 minutes and the property of Fat Separation (bleeding of oil from the emulsion) was noted.

TEST NO. 2

Seventy mls. of tap water heated to 80° F. were mixed together with 10 gms. of powdered sample in a 250 ml. beaker and stirred for about 2 minutes. Fifty mls. of liquid vegetable oil were added and stirring continued for an additional 2 minutes. The consistency and fat separation of the mixtures were noted. The beaker containing the mixture was then placed into a water bath at a temperature of 160° F. for at least 1 hour. The beaker was removed from the bath, cooled to about 80° F. and the Consistency and Fat Separation were again noted.

| Product | Test number 1 | | Test Number 2 | | | |
|---|---|---|---|---|---|---|
| | | | Before heating | | After heating | |
| | Consist-ency | Fat sep-aration | Consist-ency | Fat sep-aration | Consist-ency | Fat sep-aration |
| A | 2.0 | 2.0 | 2.0 | 2.0 | 1.5 | 1.5 |
| B | 4.0 | 4.0 | 4.0 | 3.0 | 4.0 | 4.0 |

Consistency: 1=Thick, non-pourable; 2=Thick, pours slowly; 3=Thick, pours readily; 4=Thin, pours easily.
Fat separation: 1=no traces of free fat; 2=slight traces of free fat; 3=considerable traces of free fat; 4=substantial traces of free fat.

From the results shown in the Table, it is readily seen that the product of the invention (A) has substantially better properties, e.g., emulsifying and absorbing. For example, as the result of both tests, the Consistency (pourability) product A is superior to product B. Furthermore, results under Fat Separation (bleeding of oil from the emulsion) shows product A to be consistently superior to product B. The desirable properties of the protein product are obtained in the particular process of the invention as hereinbefore described.

EXAMPLE 2

A slurry was formed with soybean flakes containing soluble protein and water at a temperature of about 90° F., the water to flakes ratio being about 14:1. The slurry was agitated for 30 minutes to extract from the flakes the soluble carbohydrate and protein materials. The slurry was adjusted to a pH of 4.5 with phosphoric acid to precipitate the protein material on and into the surfaces of the cellular flake material. The resulting slurry was heated to about 140° F. and transferred to a centrifuge where the solids and liquids were substantially separated, said solids being concentrated to about 33 percent by weight.

The solid materials were reslurried with 90° F. water to a solids content of 15 percent by weight, wet ground to obtain a particle size that would pass through a 0.010 inch perforated grinder screen, and the resulting slurry adjusted to a pH of about 6.8 with sodium hydroxide. The slurry was passed to a jet cooker and heated instantaneously to 310° F., held at that temperature for about 5 seconds and, thereafter, injected into a vacuum chamber to flash off the excess vapors and also the exposed volatile, undesirable flavor components. The slurry was fed to a spray dried under a pressure of about 5,000 p.s.i. and an exhaust temperature of 180° F. to obtain a dry particulate product.

The dried product has substantially the same desirable properties as product A of Example 1.

EXAMPLE 3

The procedure of Example 1 is substantially repeated except that the initial water-flake slurry is adjusted to a pH of about 2 to about 2.5 with phosphoric acid to dissolve the protein and carbohydrate materials out of the cellular material of the flake and the pH is subsequently adjusted to about 4.5 with sodium hydroxide instead of with phosphoric acid to precipitate the soluble protein on and into the surfaces of cellular flake material. The resulting product is substantially the same as that produced in Example 1.

EXAMPLE 4

The procedure of Example 2 is substantially repeated except that the initial water-flake slurry is adjusted to a pH of about 2 to about 2.5 with phosphoric acid to dissolve the protein and carbohydrate materials out of the cellular material of the flake and the pH is subsequently adjusted upward to about 4.5 with sodium hydroxide instead of phosphoric acid to precipitate the soluble protein on and into the surfaces of the cellular flake material. The resulting product is substantially the same as that produced in Example 2.

EXAMPLE 5

The procedure according to Example 1 is substantially repeated except that (1) the initial slurry containing the water and flakes is adjusted to a pH of about 2 to about 2.5 with phosphoric acid to dissolve the protein and carbohydrate materials out of the flakes, (2) the pH of the slurry is adjusted to the isoelectric point of the protein with sodium hydroxide instead of phosphoric acid to precipitate the protein material on and into the surfaces of the cellular flake material and (3) the pH is again readjusted to about 3 from the isoelectric point of the protein instead of neutralizing to about 6.8 as in Example 1. The resulting product is an acid product as opposed to the neutral-type product produced by the procedures of Example 1, and is suitable for use in acidic food products.

EXAMPLE 6

The procedure according to Example 2 is substantially repeated except that (1) the initial slurry containing the water and flakes is adjusted with phosphoric acid to a pH of about 2 to about 2.5 to dissolve the protein and carbohydrate materials out of the flakes, (2) the pH of the slurry is adjusted to the isoelectric point of the protein with sodium hydroxide instead of with phosphoric acid to precipitate the protein on and into the surfaces of the cellular flake material and (3) the pH is again readjusted to about 3 from the isoelectric point of the protein instead of to a pH of about 6.8 as in Example 2. The resulting product is an acid product as opposed to the neutral-type product produced in accordance with Example 2 and is suitable for use in acidic food products.

EXAMPLE 7

The procedure of Example 1 is substantially repeated except that the slurry containing about 15 percent by weight solids is adjusted to a pH of about 3 with phosphoric acid instead of to about 6.8 with sodium hydroxide.

The resulting product is an acid product which is suitable for use in acidic food products.

EXAMPLE 8

The procedure of Example 2 is substantially repeated except that the slurry containing about 15 percent by weight solids is adjusted to a pH of about 3 with phosphoric acid instead of to about 6.8 with sodium hydroxide.

The resulting product is an acid product which is suitable for use in acidic food products.

EXAMPLE 9

A slurry was formed with soybean flakes containing soluble protein and water at a temperature of about 90° F., the water to flakes ratio being about 14:1 by weight. The slurry was agitated for 30 minutes to extract from the flakes the soluble carbohydrate and protein materials. The slurry was adjusted to a pH of 4.5 with phosphoric acid to precipitate the protein material on and into the surfaces of the cellular flake material. The resulting slurry was heated to about 140° F. and transferred to a centrifuge where the solids and liquids were substantially separated, said solids being concentrated to about 33 percent by weight. The concentrated slurry is dried by conventional means, e.g., oven or tray drying, spray drying, granulated and stored.

In an alternate procedure, the concentrated solids are reslurried with 90° F. water to a solids content of about 15 percent by weight, wet ground to obtain a particle size that would pass through a 0.010 inch perforated screen and the resulting slurry is fed to a spray drier under a pressure of 5,000 p.s.i. and an exhaust temperature of 180° F. to obtain a dry particulate product.

The resulting product is a particulate or granulated product having a pH of about 4.5.

In place of the particular acids, bases, pH ranges and process conditions employed in the examples, other acids, bases, pH ranges and process conditions as hereinbefore described may be substituted to obtain protein products having substantially the same properties.

We claim: of

1. A method for producing a protein product from defatted soybean materials comprising the steps of: forming an aqueous first slurry with the defatted soybean material in the pH range selected from one of the ranges of 6.5–9 and about 1.2–2.5, agitating the first slurry to simultaneously extract carbohydrate and protein materials from the solid cellular material portion of the soybean material without substantially denaturing the protein material, adjusting the pH of the first slurry to form about 4–5 to precipitate the protein on and into the surfaces of the solid cellular material present in the first slurry, separating the protein coated cellular from the liquid portion of the first slurry containing the carbohydrate material, forming on aqueous second slurry containing the protein coated cellular material and having a solids content of from about 12 to about 18 percent, subjecting the second slurry to dynamic, instanteous heating at a temperature of from about 220° F. to about 400° F. under pressure and releasing the pressure on said slurry to flash off the undesirable flavor components, and drying the protein coated cellular material.

2. A method for producing a protein product from defatted soybean materials comprising the steps of: forming an aqueous first slurry with the defatted soybean material in the pH range selected from one of the ranges of about 6.5–9 and about 1.2–2.5, agitating the first slurry to simultaneously extract carbohydrate and protein materials from the solid cellular material portion of the soybean material without substantially denaturing the protein material, adjusting the pH of the first slurry to from about 4–5 to precipitate the protein on and into the surfaces of the solid cellular material present in the first slurry, separating the protein coated cellular material from the liquid portion of the first slurry containing the protein coated cellular material and adjusting the pH of the second slurry to a value selected from one of the ranges of about 2.5–3.5 and about 5.5–7.5, controlling the solids content of the second slurry from about 12 to about 18 percent, subjecting the second slurry to dynamic, instantaneous heating at a temperature of from about 220° to about 400° F. under pressure and releasing the pressure on said slurry to flash off the undesirable flavor components, and drying the protein coated cellular material.

3. A method for producing a protein product which comprises the steps of forming an aqueous first slurry containing water and defatted soybean flakes in a ratio of from about 2:1 to about 100:1 by weight, controlling the pH of the slurry from about 1.2 to about 2.5 and at a temperature of from about 50° F. to about 180° F., agitating the first slurry to simultaneously dissolve carbohydrate and protein materials from the solid portion containing solid cellular materials without substantially denaturing the protein, adjusting the pH of the slurry from about 4 to about 5 to precipitate the dissolved protein on and into the surfaces of the solid cellular material present in the slurry, separating the protein coated cellular material from the liquid portion of the first slurry, forming an aqueous second slurry containing the protein coated cellular material, adjusting the pH of the second slurry to a selected value in one of the ranges of about 2.5 to about 3.5 and about 5.5 to 7.5, controlling the solids content of the second slurry from about 12 to about 18 percent, subjecting the second slurry to dynamic, instantaneous heating at a temperature of from about 220° to about 400° F. under pressure and releasing the pressure on said slurry to flash off the undesirable flavor components, and subsequently converting the slurry to a dried product.

4. A method for producing a protein product which comprises the steps of forming an aqueous first slurry containing water and defatted soybean flakes in a ratio of from about 2:2 to about 100:1 by weight, controlling the pH of the slurry from about 6.5 to about 9 and at a temperature of from about 50° to about 180° F., agitating the first slurry to simultaneously dissolve carbohydrate and protein materials from the solid portion containing solid cellular materials without substantially denaturing the protein, adjusting the pH of the slurry from about 4 to about 5 to precipitate the dissolved protein on and into the surfaces of the solid cellular material present in the slurry, separating the protein coated cellular material, adjusting the pH of the second slurry to a selected value in one of the ranges of about 2.5 to about 3.5 and about 5.5 to about 7.5, controlling the solids content of the second slurry from about 12 to about 18 percent, subjecting the second slurry to dynamic, instantaneous heating at a temperature of from about 220° to about 400° F. under pressure and releasing the pressure on said slurry to flash off the undesirable flavor components, and subsequently converting the slurry to a dried product.

* * * * *